(12) United States Patent
Malik

(10) Patent No.: US 6,574,324 B1
(45) Date of Patent: Jun. 3, 2003

(54) SYSTEM AND METHOD FOR LONG DISTANCE AUTOMATIC CALL-BACK

(75) Inventor: Dale W. Malik, Dunwoody, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/444,709

(22) Filed: Nov. 24, 1999

(51) Int. Cl.[7] ............................................... H04M 3/42
(52) U.S. Cl. ........................ 379/210.01; 379/88.19; 379/201.01; 379/221.08
(58) Field of Search ....................... 379/210.01, 209.01

(56) References Cited

U.S. PATENT DOCUMENTS

| | | | | |
|---|---|---|---|---|
| 5,661,790 A | * | 8/1997 | Hsu ....................... | 379/209.01 |
| 5,701,301 A | | 12/1997 | Weisser, Jr. ............. | 370/428 |
| 5,774,533 A | | 6/1998 | Patel ...................... | 379/127.03 |
| 6,035,027 A | * | 3/2000 | Alleman ................. | 379/204.01 |
| 6,339,640 B1 | * | 1/2002 | Chen et al. ............. | 379/201.01 |

OTHER PUBLICATIONS

Bellcore Technical Reference NWT–001284, Issue 1, "Advanced Intelligent Network (AIN) 0.1 Switching Systems Generic Requirements" (Aug. 1992).

Bellcore Document No. GR–1298–CORE, "AINGR: Switching Systems".

* cited by examiner

Primary Examiner—Harry S. Hong
Assistant Examiner—Karen Le
(74) Attorney, Agent, or Firm—Shaw Pittman LLP

(57) ABSTRACT

A system and method for providing automatic call-back services between subscribers and designated callers. The system and method use the features of an advanced intelligent network to intercept calls to a subscriber from designated callers. The callers are instructed to hang up and wait for the return call. The system then initiates a return call originating from the subscriber's line and using the subscriber's long distance carrier. The system and method allows subscribers to identify certain callers for whom the subscriber is willing to incur long distance charges when the caller attempts to call the subscriber. Unlike traditional systems allowing a called party to reverse charges for incoming calls, the system and method of the present invention advantageously uses the subscriber's preferred long distance service provider. In this manner, the subscriber need not pay the additional surcharges normally associated with traditional "collect" calling services.

27 Claims, 3 Drawing Sheets

SYSTEM AND METHOD FOR LONG DISTANCE AUTOMATIC CALL-BACK

BACKGROUND

1. Field of the Invention

The present invention relates generally to telecommunications systems. More particularly, the present invention relates to an advanced intelligent network system for facilitating a subscriber's billing preferences.

2. Background of the Invention

Long distance telephone calls are normally billed to the calling party number ("CgPN") unless the calling party provides an alternative billing number. Using conventional systems and methods, alternative billing numbers may be a credit card, a calling card or some other billing code recognized by the local exchange carrier ("LEC") and the long distance carrier, i.e., inter-exchange carrier ("IXC"), as a valid billing account. Additionally, the calling party may place a collect call wherein an operator or an automated system obtains authorization from the called party to "reverse" the charges. In this situation, the calling party's LEC and IXC must communicate with the called party's LEC to bill the called party for the call.

Each of the above identified options increase the costs the LECs and IXCs incur to provide the telephone connection between parties. The increased costs are generally passed on to the billed party. Generally, calling card, credit card and collect calls cost are more expensive than direct-dialed long distance calls. Also, subscribers often have preferred long distance carriers that they wish to bill calls through. Such long distance carriers may offer incentives to subscribers who use their services. Such incentives include, e.g., earning frequent flyer miles for each dollar spent in long distance calling, reduced rates for higher calling volumes, and earning points which can be used towards the purchase of special merchandise.

To keep costs down and to retain the benefits of using a single preferred provider, some subscribers developed special procedures to "manually" reverse the charges for some long distance calls. For example, some parents may wish to pay for incoming calls from their child who is away at college. One manual technique used by some parents is partially effective. In this technique, the child places an initial telephone call to the parents' home telephone number. After the parents answer the call, both parties hang up their telephones, and the parents then return the call. As noted above, this technique is only partially effective because the child still incurs some long distance charges. An alternative manual technique used by some parents can eliminate this problem. In this technique, the parents may instruct their child to direct-dial the parents' home telephone number, let the telephone ring twice and then hang up. When the parents hear only two rings before the caller hangs up, they know that their child wishes to speak to them. The parents then call the child back using the parents' preferred long distance carrier.

Before the advent of caller-Id, such procedures were effective only if (1) the called party is home, and hears the phone ring only two times, (2) the called party has only one calling party using the code of two rings followed by a hang up (additional calling parties would require more elaborate procedures, e.g., caller I rings once and hangs up, caller II rings twice and hangs up, caller III rings once, hangs up, then immediately calls back, rings once and hangs up) and (3) the called party does not accidentally answer the phone before the calling party hangs up.

With the advent of caller-Id services, some of these problems were alleviated. For example, using call-Id, the called party is informed that a call was received and the time it was received, even if the called party was not home when the call came in. The caller-Id system also provides the calling party's number or name (if calling name delivery service is active) so the called party will know if the call was from someone that should be called back using the called party's preferred long distance carrier. Although caller-Id identifies the calling party, the call-back system is still manually operated. The burden of returning the call is placed on the called party. Thus a system and method providing long distance automatic call-back from the called party to the calling party is desirable.

Moreover, unless the called party also has call-waiting with caller-Id, if the called party's line is busy, the calling party must redial the called party's line until it is available before the caller-Id system is activated. Conventional systems currently provide an automatic call-back service wherein, if the called party's line is busy, the system monitors the line and initiates a call when the line is free. However, the call is generated and billed as a call from the original calling party to the original called party. No service currently exists wherein, even if the called party's line is busy, a telephone call is automatically connected from the called party back to the calling party, thereby billing the "called party" using that party's preferred long distance carrier.

Another conventional means for reversing charges for long distance calling uses "toll free" numbers. Telephone calls to toll free numbers, i.e., 1-800 or 1-888 numbers, are not charged to the calling party. However, as with collect calls or calling card calls described above, the subscriber will ultimately pay a higher price because of the additional cost of providing toll service.

SUMMARY OF THE INVENTION

The present invention utilizes an Advanced Intelligent Network ("AIN") to provide a system and method for automatic call-back services for long distance calls. AIN systems are described in U.S. Pat. No. 5,701,301, U.S. Pat. No. 5,774,533, Bellcore Specification TR-NWT-001284, Switching Systems Generic Requirements for AIN 0.1, and Telcordia Specification GR-1298, AINGR: Switching Systems, which are all incorporated herein by reference in their entirety.

When a call is placed from a designated calling party to a called party, the system and method of the present invention intercepts the call to prevent a bill from being generated for the calling party's line. The system and method of the present invention then initiates a call from the called party's line to the calling party. If either the original called party or the original calling party are not available (i.e., the line is busy or not answered) when the automatic call-back system initiates the call, the system tries again. The frequency and number of retries can be pre-set by the LEC or by the subscriber.

Under the system and method of the present invention, a subscriber first identifies the authorized parties that the subscriber agrees to automatically call-back, thus incurring the cost of the call. In a preferred embodiment, the list comprises the telephone directory numbers ("DNs") from which the authorized parties will call the subscriber. In an alternate embodiment, the list comprises personal identification numbers ("PINs") assigned to the authorized parties. The list may be created using any suitable procedure and is stored in a database on a service control point ("SCP"). The database also stores the address, i.e., the point code, for the subscriber's switch, which is necessary for creating the call back to the authorized parties.

A suitable trigger is provisioned on the subscriber's service switching point ("SSP") or "switch" for the subscriber's line. Whenever a call to the subscriber's line is received at the subscriber's switch the trigger causes the switch to send a database query to the SCP. In response to the trigger, the SCP checks the database to see if the calling party is on the subscriber's list of authorized parties for the long distance automatic call-back service. If the calling party is not an authorized party, the SCP sends a Continue message or an Authorize_Termination message to the switch and the call is terminated to the subscriber as a normal call.

If the calling party is an authorized party, the SCP notes the call in the database, then instructs the switch to disconnect the call. In a preferred embodiment, the switch plays an announcement to the caller informing the caller that the long distance automatic call-back service has been activated and instructing the caller to hang up. In this preferred embodiment, the switch also provides the caller with an option to let the call go through using normal billing procedures. If the caller accepts the option, the call proceeds and the calling party line is billed for the call. If the caller declines, the call is disconnected either by the switch or when the caller hangs up.

On a periodic basis, e.g., every 5 minutes, the SCP looks through its database to see which subscribers have entries indicating a call-back is required. When such an entry is identified, the SCP sends a message to the subscriber's switch, identified by its point code, instructing the switch to create a call. In a preferred embodiment, the message sent is a Create_Call message defined in the AIN 0.2 standards. The message comprises the subscriber's telephone DN and the DN for the authorized party to be called from the subscriber's line. In addition to the Create_Call message, the SCP sends a Send_Notification request.

When the switch receives the instructions from the SCP it checks the subscriber's line to see if it is available. If the line is available, the switch rings the line and waits for the line to be answered. If the line is answered, the switch then initiates the call to the authorized calling party. In a preferred embodiment, the switch plays a message informing the subscriber that a long distance call-back is being connected.

The call is processed by the subscriber's switch and the authorized calling party's switch just like any normal call. However, in response to the Send_Notification request, the subscriber's switch informs the SCP of the result of the call. The SCP uses this information to update the database of subscribers requiring a call-back. For a predetermined period or a predetermined number of attempts, the SCP periodically checks its database and initiates call-back procedures as required. After the predetermined period expires or the predetermined number of attempts have been made, the SCP updates the database and stops the call-back procedures. Similarly, if a call-back is successfully connected between the two parties, the SCP updates the database accordingly.

It is an object of the present invention to provide an automated system for placing a return call using a subscriber's telephone line when an authorized caller dials the subscriber's number.

It is a further object of the present invention to use an Advanced Intelligent Network to "reverse" the charges for long distance calls placed by a first party to a second party without incurring a long distance bill for the first party.

It is another object of the present invention to provide a system to allow subscribers to be billed for designated inbound calls.

It is another object of the present invention to provide a system to allow subscribers to use a preferred long distance service provider to return calls placed by designated callers.

These and other objects of the present invention are described in greater detail in the detailed description of the invention, the appended drawings and the attached claims.

DETAILED DESCRIPTION OF THE INVENTION

Figure 1:
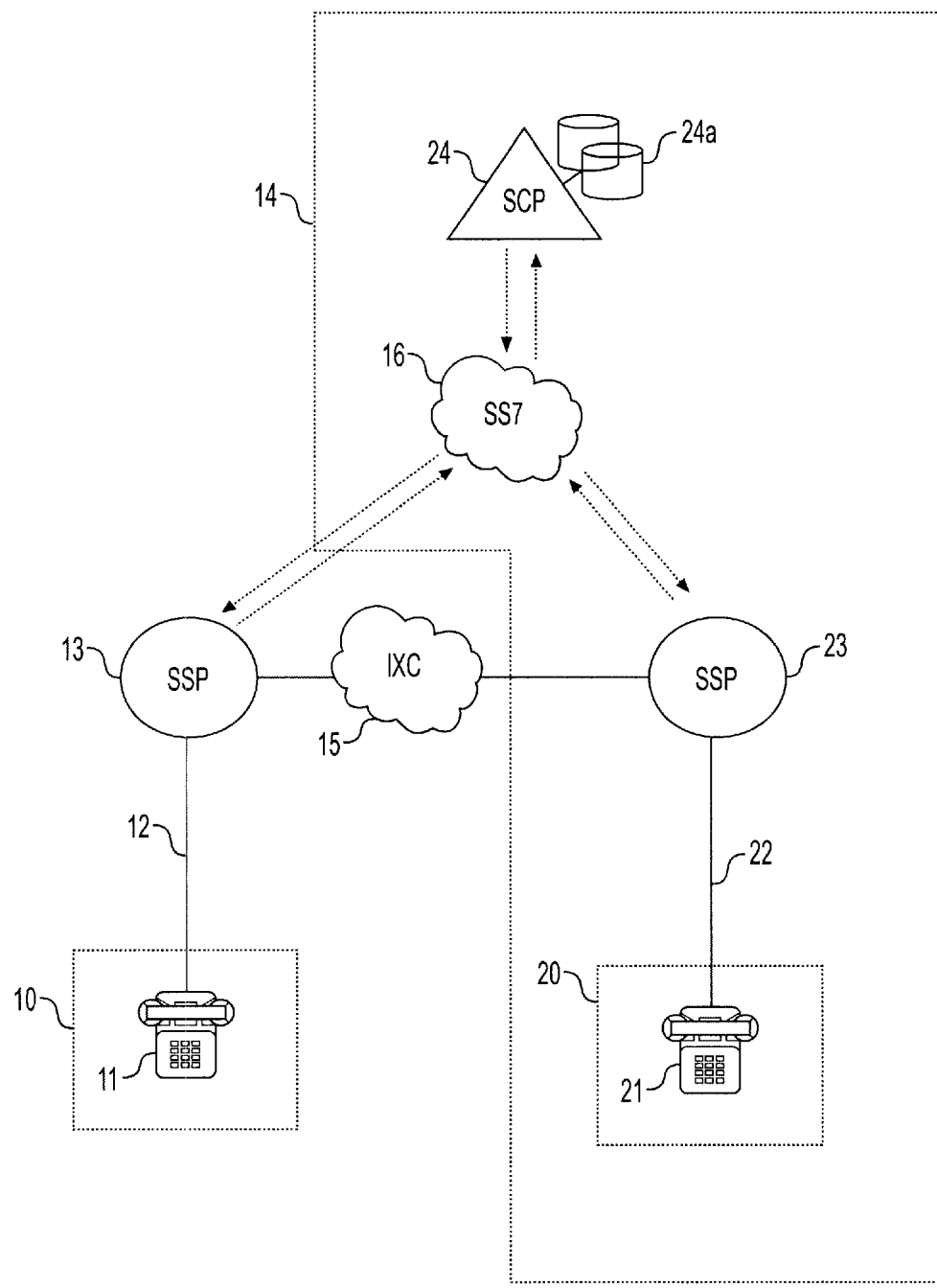
FIG. 1 is a schematic diagram showing the key components of an AIN used in an embodiment of the present invention.

FIG. 1 shows the key components of the AIN used in the present invention. Such AIN components include one or more switches, SSP 13 and 23, SCP 24, and Common Channel Signaling System 7 ("SS7") network 16. The steps performed in a preferred invention are shown in the flowchart in FIG. 2.

Figure 2:
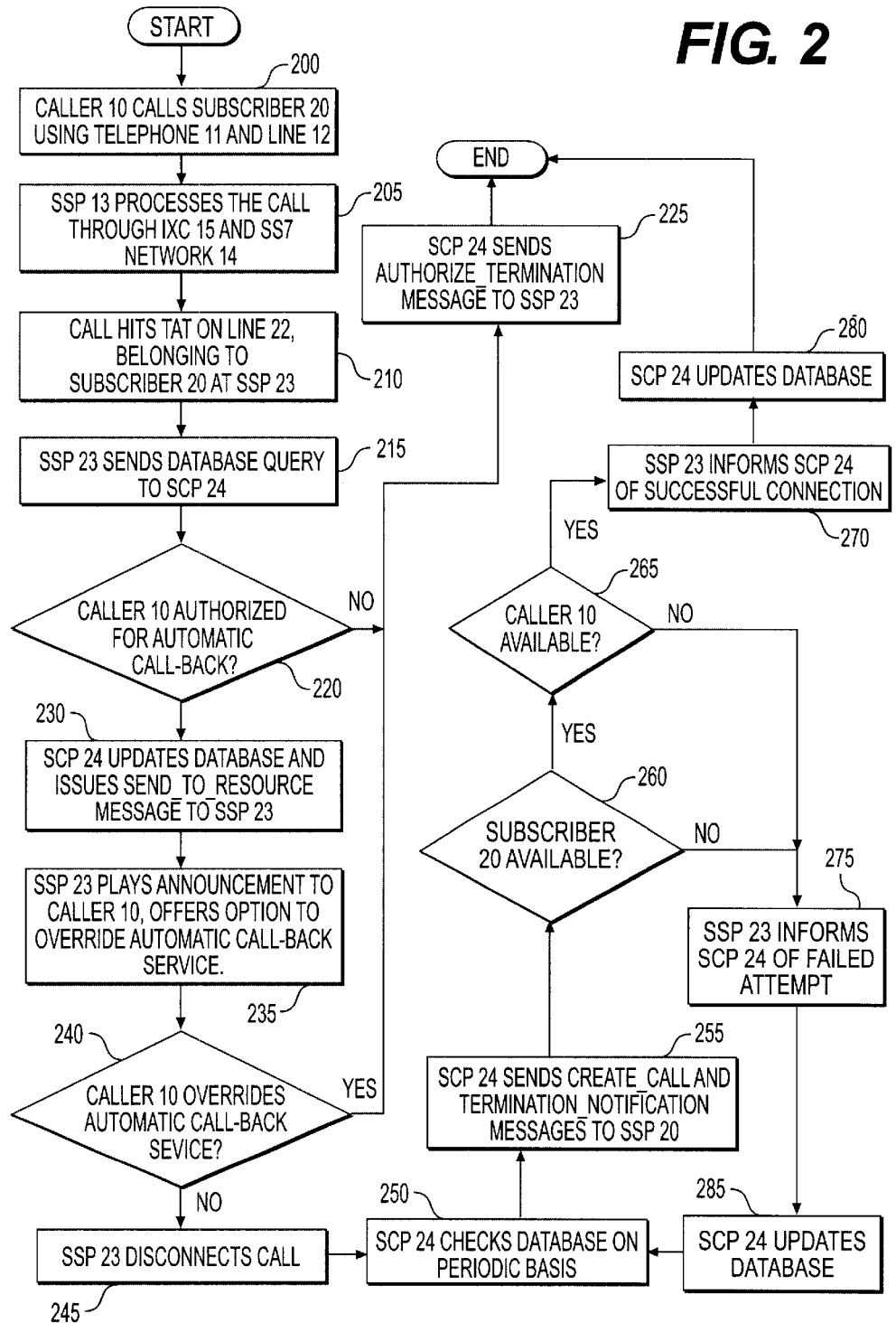
FIG. 2 is a flowchart showing the steps performed in a preferred embodiment of the present invention.

As shown in FIG. 2, the sequence starts in step 200, when caller 10 calls subscriber 20 using telephone 11 and line 12 (shown in FIG. 1). In step 205, SSP 13 processes the call with subscriber 20's switch, SSP 23, just as it would process any call between the two parties. As shown in FIG. 1, caller 10 need not be served by LEC 14, which serves subscriber 20. Caller 10's telephone call in this example is processed through IXC 15, with signaling between the switches processed within SS7 network 16. When the call setup message reaches SSP 23, it hits the trigger on subscriber 20's line 22 (step 210). In a preferred embodiment, the trigger is a Termination_Attempt_Trigger ("TAT").

In response to the TAT, SSP 23 sends a database query to SCP 24 (step 215). SCP 24 checks to see whether or not caller 10 is on subscriber 20's list of authorized callers who will receive an automatic call-back (step 220). The list is compiled and organized in any suitable manner, and is stored in database 24a on SCP 24. In a preferred embodiment, the list has the subscriber's telephone DN, the point code for the subscriber's SSP and the telephone DNs for each person authorized to receive an automatic call-back through the system. Thus, in response to the database query, SCP 24 looks up subscriber 20's DN, i.e., the called party number ("CdPN"), then checks to see if caller 10's DN, i.e., the calling party number ("CgPN"), is associated with subscriber 20.

If the CgPN is not associated with subscriber 20, then SCP 24 moves on to step 225, where it issues an Authorize_Termination message to SSP 23 and the call is terminated to subscriber 20's telephone, just like any other call to line 22. If subscriber 20 answers the call on telephone 21 or (or some other customer premises device), the bill for the call will begin tolling for caller 10. If the call is not answered, neither party is changed for the call.

If SCP 24 locates caller 10's DN on subscriber 20's authorization list in database 24a, in step 230, SCP 24 updates database 24a to flag caller 10 for a call-back from subscriber 20. Furthermore, SCP 24 responds to the database query by issuing a Send_To_Resource message to SSP 23. This message instructs SSP 23 to play an announcement to caller 10 according to the resource identified by the SCP. For the automatic call-back system of the present invention, the announcement informs caller 10 that the subscriber has authorized an automatic call-back to caller 10 (step 235). The announcement further instructs caller 10 to hang up to allow the call-back system to return the call. In a preferred embodiment, the announcement further offers caller 10 the opportunity to override the automatic call-back system (step 240). If caller 10 elects to override the system, SCP 24 moves on to step 225 and the call proceeds as a regular call billed to caller 10, as described above. If caller 10 does not override the automatic call-back system, SSP 23 disconnects the call (step 245).

As noted above, SCP 24 periodically checks database 24a to identify all callers requiring a call-back from a subscriber under the current invention (step 250). In a preferred embodiment, the subscriber's LEC is free to configure the frequency of the SCP's checks. Moreover, the LEC is free to configure the number of times the system attempts to automatically return the call. In an alternate embodiment, the LEC could allow the subscriber to elect the frequency and number of attempts on a case-by-case basis for each entry in the subscriber's list of authorized users of the system.

In step 255, SCP 24 issues suitable AIN messages to SSP 23 instructing SSP 23 to set up a call from subscriber 20 to caller 10. In a preferred embodiment, a Create_Call message defined in AIN 0.2 Generic Requirements is sent to SSP 23. The Create_Call message comprises subscriber 20's DN in the CgPN field and caller 10's DN in the CdPN field. As noted above, SCP 24 is able to initiate the communication to the subscriber's SSP because database 24a contains the point code for the SSP. Additionally, SCP 24 sends a Send_Notification request to SSP 23.

In steps 260 and 265, SSP 23 determines whether or not both subscriber 20 and caller 10 are available. In a preferred embodiment, SSP 23 first rings line 22 and waits for the line to be answered. If it is answered, SSP 23 plays an announcement to subscriber 20 informing the subscriber to hold while the system dials caller 10. If caller 10 is available, i.e., the call is terminated by SSP 13 to line 12 and caller 10 answers the call, SSP 23 informs SCP 24 that the call was successful (step 270). On the other hand, if either subscriber 20 or caller 10 are not available, i.e., lines 22 or 12 are busy or not answered, SSP 23 informs SCP 24 that the call was not successful (step 275).

If the call was successful, SCP 24 updates database 24a to remove the flag on caller 10 and the automatic call-back procedure is complete (step 280). However, if the call was not successfully connected, SCP 24 updates database 24a to increment a counter tracking the number of attempts made by the automatic call-back system (step 285). In a preferred embodiment, if the counter is greater than a predetermined number defined by the LEC or subscriber, as described above, SCP 24 zeros out the counter and removes the flag from the caller's entry. Otherwise, SCP 24 returns to step 255 where the periodic check of the database is repeated.

First Alternate Embodiment

In a first alternate embodiment, the subscriber's list of persons authorized to receive an automatic call-back through the system comprises one or more personal identification numbers ("PINs"). One advantage offered by this embodiment is that the subscriber need not know the telephone DN that will be used by the authorized users of the automatic call-back system.

The PINs may be of any appropriate length, and may be unique to the subscriber or to each caller, depending on the subscriber's requirements. For example, a business entity seeking to reduce costs of "toll free" 800-numbers may use a simple PIN known to the public, or no PIN at all. Effectively, every incoming call to the business subscriber's DN will be processed under the automatic call-back system described herein. On the other hand, the a private subscriber may wish to use a single PIN that the subscriber gives to each person who is authorized for the call-back service. Similarly, the individual PINs could be selected by the subscriber for each authorized person.

Figure 3:
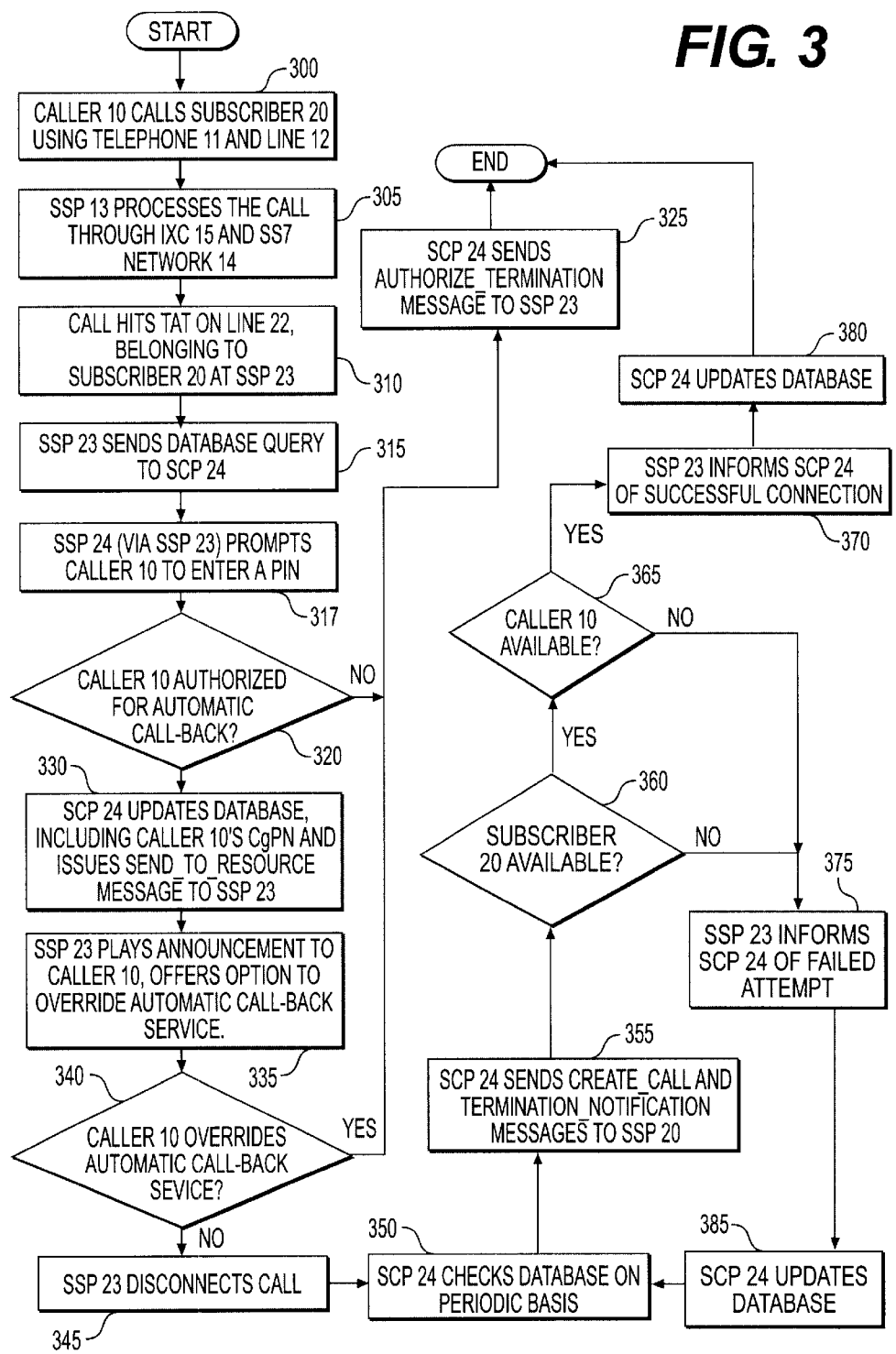
FIG. 3 is a flowchart showing the steps performed in a first alternate embodiment of the present invention.

In this embodiment, most of the steps described above are still performed, i.e., steps 300–385 in FIG. 3 are identical to steps 200–285 in FIG. 2, except as explained herein. However, in new step 317, shown in FIG. 3, SCP 24 instructs SSP 23 to prompt caller 10 to enter a PIN. In step 320, SCP 24 looks up subscriber 20's DN as described above, and checks to see if the PIN entered by caller 10 is associated with subscriber 20. If so, database 24a is updated in step 230 as described above. However, in addition to flagging caller 10 for a call-back, SCP 24 also records the telephone DN from which caller 10 is presently calling. That is, in step 330, SCP 24 logs the CgPN in the database. In this manner, when SCP 24 issues the Create_Call message, it has a telephone number to use for the new called party.

Second Alternate Embodiment

In the second alternate embodiment the subscriber's authorization list is a combination of telephone DNs and PINs. Thus, under this embodiment, the subscriber can further define the list of authorized users of the automatic call-back system. This embodiment may implemented in a variety of ways. For example, the SCP could be programmed to prompt every caller to the subscriber's DN to enter a PIN. Thus, the steps described in FIG. 3 would be performed as described above.

In another embodiment, the SCP could be programmed to check the database first to see if the caller's DN is associated with the subscriber. If the caller's DN is in the subscriber's authorization list and also requires a PIN, the SCP then prompts the caller to enter the PIN. Thus in this embodiment, not all callers must have a PIN.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A method for automatically placing a return call to a calling party, after an inbound call is initiated by the calling party to a called party, comprising the steps of:

establishing a database, wherein the database comprises a directory number for the called party and a plurality of authorized users associated with the called party;

intercepting the inbound call before a connection is established between the calling party and the called party; and determining whether the calling party is the one of the plurality of authorized users, instructing the calling party to hang up if the calling party is the one of the plurality of authorized users;

placing the return call to the calling party; and establishing the connection between the calling party and the called party.

2. The method of claim 1, further comprising the step of checking whether the called party is available before placing the return call.

3. The method of claim 1, wherein the placing step is repeated a number of times.

4. The method of claim 1, further comprising the step of checking if the calling party is available before placing the return call.

5. The method of claim 1, further comprising the step of comparing a calling number associated with the calling party with a plurality of telephone numbers associated with the plurality of authorized users in the database.

6. The method of claim 1, further comprising the steps of:
collecting a personal identification number from the calling party; and
comparing the personal identification number with the plurality of authorized users associated with the called party in the database, wherein the plurality of authorized users in the database include at least one personal identification number associated with the plurality of authorized users,
wherein the calling party is the one of the plurality of authorized users if the personal identification number collected from the calling party is one of the at least one personal identification number associated with the plurality of authorized users.

7. The method of claim 1, further comprising the step of providing a telephone number associated with the at least one of the plurality of authorized users as an authorized caller number in the database.

8. The method of claim 7, further comprising the steps of:
looking up the directory number for the called party and the authorized caller number in the database;
writing the directory number in a calling party number field of a Create_Call message; and
and writing the authorized caller number in a called party field of the Create_Call message.

9. The method of claim 1, wherein the return call is placed by sending a Create_Call message from a service control point to a service switching point in a communications network.

10. The method of claim 1, wherein the inbound call is intercepted by a Termination_Attempt_Trigger on a service switching point associated with the called party.

11. The method of claim 1, wherein if the calling party is not one of the plurality of authorized users, the method further includes the step of terminating the inbound call to the called party.

12. The method of claim 1, wherein the called party incurs a charge for the connection between the calling party and the called party.

13. A system for automatically placing a return call to a calling party when an inbound call is initiated by the calling party to a called party in an intelligent network comprising:
a database at a service control point (SCP) that includes a directory number for the called party and a list of users associated with the called party, wherein the users are authorized to receive the return call;
a trigger on a service switching point (SSP) serving the called party; and
means for determining whether the calling party is on the list of users before the connection between the calling party and the called party is established,
wherein the service control point instructs the service switching point to place the return call to the calling party and establish the connection between the calling party and the called party if the calling party is on the list of users.

14. The system of claim 13, wherein the SSP checks whether the calling party and the called party are available and waits until the calling party and the called party are available before placing the return call.

15. The system of claim 13, wherein the SCP sends a Create_Call message to the SSP to place the return call.

16. The system of claim 13, wherein the SCP sends a plurality of the Create_Call messages until the return call is successfully established.

17. The system of claim 13, wherein the SCP sends a plurality of Create_Call messages for a pre-determined number of attempts.

18. The system of claim 13, wherein the list of users includes a plurality of telephone numbers.

19. The system of claim 13, wherein the list of users includes at least one personal identification number.

20. The system of claim 13, wherein the SSP intercepts the inbound call using a Termination_Attempt_Trigger.

21. The system of claim 13, further comprising means for allowing the calling party, if listed on the list of users, to override a placing of the return call so that the inbound call is terminated to the called party.

22. The system of claim 13, wherein if the calling party is not on the list of users, the system terminates the inbound call to the called party.

23. The system of claim 13, wherein the called party incurs a charge for the connection between the calling party and the called party.

24. The system for claim 13, wherein the system prevents a charge for the connection between the calling party and the called party from being incurred on the calling party.

25. A method for reversing telephone call charges in an intelligent network comprising the steps of:
receiving a first telephone call at a switch associated with a called party;
suspending the first telephone call on the switch to determine whether a calling party is an authorized designated user by the called party before a connection between the calling party and the called party is established;
sending a query by the switch to a service control point (SCP), wherein the query includes a calling number associated with the calling party and a called number associated with the called party;
receiving a response from the SCP at the switch;
disconnecting the first telephone call if the response indicates that the calling party is an authorized user; and
initiating a second telephone call by the switch to establish a connection between the called party and the calling party,
wherein the called party incurs a charge for the connection.

26. The method of claim 25, wherein the method further includes the step of provisioning a trigger on the switch to send query to the SCP.

27. The method of claim 25, further comprising the step of prompting an option to the called party for overriding an initiation of the second telephone call so that the first telephone call is terminated to the called party.

* * * * *